(12) United States Patent
Hartung et al.

(10) Patent No.: US 10,247,005 B2
(45) Date of Patent: Apr. 2, 2019

(54) BLADE OR VANE ARRANGEMENT FOR A TURBOMACHINE

(71) Applicant: MTU Aero Engines AG, Munich (DE)

(72) Inventors: Andreas Hartung, Munich (DE); Manfred Schill, Munich (DE); Gerhard-Heinz Roesele, Aichach (DE)

(73) Assignee: MTU Aero Engines AG, Munich (DE)

( * ) Notice: Subject to any disclaimer, the term of this patent is extended or adjusted under 35 U.S.C. 154(b) by 269 days.

(21) Appl. No.: 14/934,970

(22) Filed: Nov. 6, 2015

(65) Prior Publication Data

US 2016/0138401 A1    May 19, 2016

(30) Foreign Application Priority Data

Nov. 13, 2014 (DE) .......... 10 2014 223 231

(51) Int. Cl.
| | |
|---|---|
| *F01D 5/14* | (2006.01) |
| *F01D 5/16* | (2006.01) |
| *F04D 29/66* | (2006.01) |
| *F04D 29/08* | (2006.01) |
| *F01D 9/04* | (2006.01) |
| *F16F 15/32* | (2006.01) |

(52) U.S. Cl.
CPC .......... *F01D 5/14* (2013.01); *F01D 5/16* (2013.01); *F01D 9/041* (2013.01); *F04D 29/083* (2013.01); *F04D 29/666* (2013.01); *F16F 15/32* (2013.01); *F05D 2230/232* (2013.01); *F05D 2230/237* (2013.01); *F05D 2260/30* (2013.01); *F05D 2260/96* (2013.01); *F05D 2260/961* (2013.01)

(58) Field of Classification Search
CPC ... F01D 5/16; F01D 5/26; F01D 9/041; F01D 5/14; F01D 5/161; F04D 29/083; F04D 29/666; F16F 15/32
USPC .......................................... 416/500
See application file for complete search history.

(56) References Cited

U.S. PATENT DOCUMENTS

| | | | |
|---|---|---|---|
| 2,349,187 A | 5/1944 | Meyer | |
| 2,462,961 A * | 3/1949 | Harker | B64C 11/008 188/266 |
| 4,649,712 A | 3/1987 | Tate, Jr. et al. | |
| 6,125,977 A * | 10/2000 | Nekomoto | E04B 1/985 188/378 |
| 6,554,112 B2 * | 4/2003 | Kato | F16F 7/10 188/378 |
| 9,765,625 B2 * | 9/2017 | Stiehler | F01D 5/10 |

(Continued)

FOREIGN PATENT DOCUMENTS

| | | |
|---|---|---|
| DE | 2435517 A1 | 2/1975 |
| DE | 7701540 U1 | 4/1977 |

(Continued)

*Primary Examiner* — Carlos A Rivera
*Assistant Examiner* — Sang K Kim
(74) *Attorney, Agent, or Firm* — Barlow, Josephs & Holmes, Ltd.

(57) ABSTRACT

A blade or vane arrangement for a turbomachine includes a turbomachine blade or vane and at least one tuning element guide housing with at least one cavity, in which at least one tuning element, which is provided for impact contact with the tuning element guide housing is taken up, the tuning element guide housing being arranged in a recess of the turbomachine blade or vane, wherein the cavity of the tuning element guide housing in which the tuning element is taken up, is closed in a gas-tight manner.

11 Claims, 3 Drawing Sheets

(56) References Cited

U.S. PATENT DOCUMENTS

2013/0058785 A1\* 3/2013 Kellerer .................. F01D 5/16
                                                            416/1
2013/0294913 A1  11/2013 Campbell et al.

FOREIGN PATENT DOCUMENTS

| DE | 19913265 A1 | 9/2000 |
| DE | 102010051529 A1 | 5/2012 |
| EP | 1892377 A1 | 2/2008 |
| EP | 2966262 A1 | 1/2016 |
| FR | 2522364 A1 | 9/1983 |
| GB | 2111130 A | 6/1983 |
| WO | 2012095067 A1 | 7/2012 |

\* cited by examiner

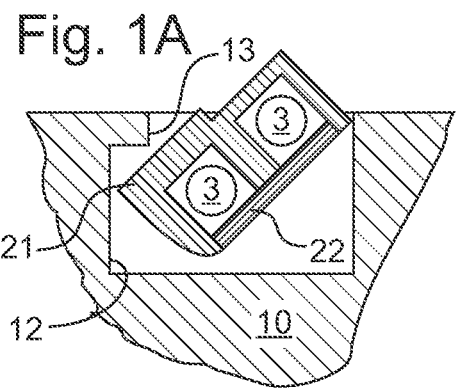
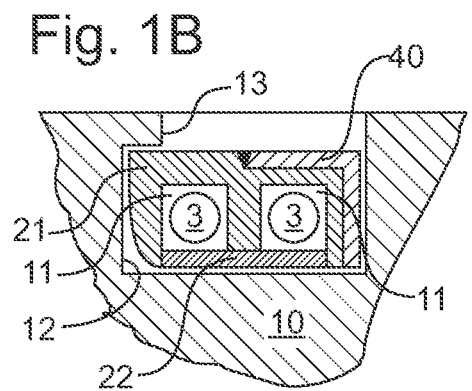
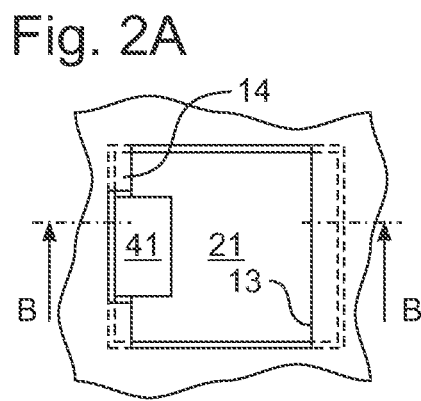
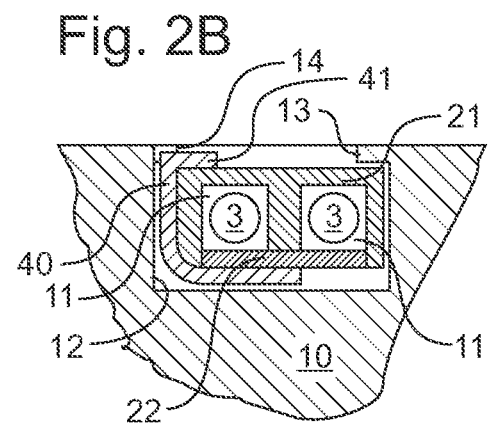
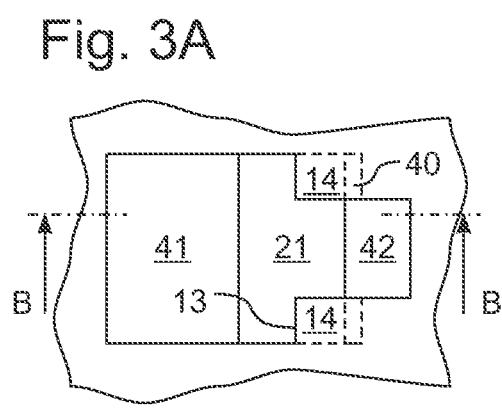
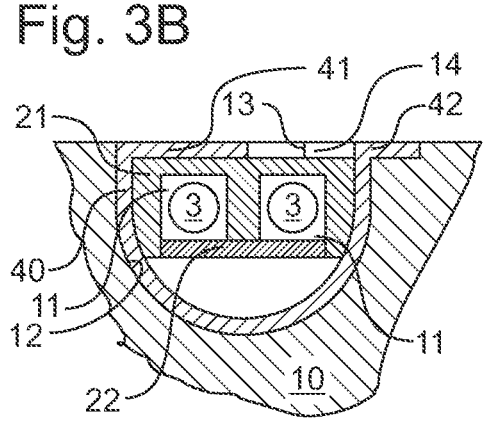

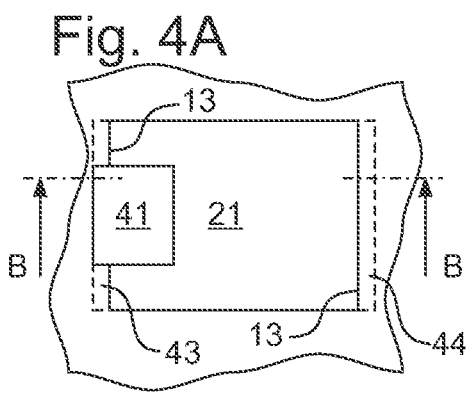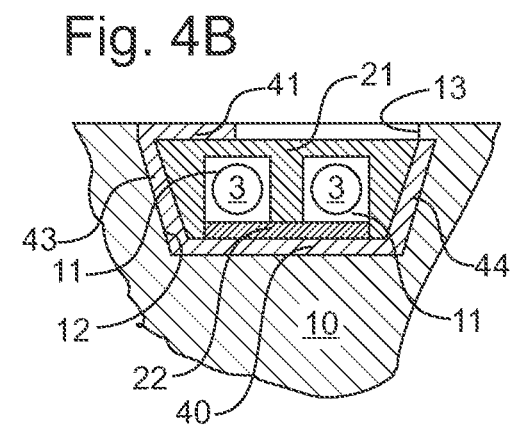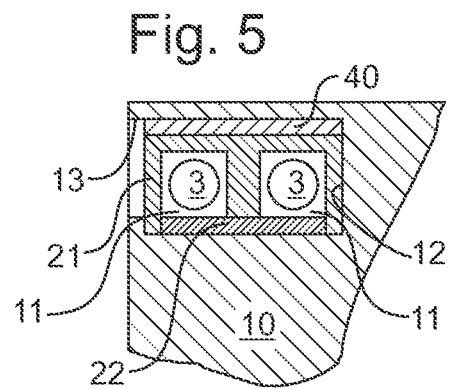

BLADE OR VANE ARRANGEMENT FOR A TURBOMACHINE

BACKGROUND OF THE INVENTION

The studies that have led to this invention were supported according to the Financial Aid Agreement No. CSJU-GAM-SAGE-2008-001 under the Seventh Framework Program of the European Union (FP7/2007-2013) for Clean Sky Joint Technology Initiative.

The present invention relates to a blade or vane arrangement for a turbomachine; a turbomachine, in particular a gas turbine, having a blade or vane arrangement for a turbomachine; as well as a method for manufacturing a blade or vane arrangement for a turbomachine.

Known from WO 2012/095067 A1, taken as a complementary reference, the content of which is incorporated expressly to the full extent in the present disclosure, is a blade or vane arrangement for a turbomachine having a turbomachine blade or vane and a multi-part guide housing for a tuning element with a cavity in which a tuning element that is provided for impact contact with the tuning element guide housing is taken up, the tuning element guide housing being arranged in a recess of the turbomachine blade or vane.

SUMMARY OF THE INVENTION

An object of one embodiment of the present invention is to improve a turbomachine.

This object is achieved by means of a blade or vane arrangement for a turbomachine of the present invention. The present invention sets forth a turbomachine having a blade or vane arrangement for a turbomachine as described herein, and a method for manufacturing a blade or vane arrangement for a turbomachine as described herein. Advantageous embodiments of the invention are the subject of the dependent claims.

According to one aspect of the present invention, a blade or vane arrangement for a turbomachine has a turbomachine blade or vane and one or more tuning element guide housings that each have one or more cavities, in each of which is taken up one or more tuning elements that are provided with the tuning element guide housing for impact contact, wherein the tuning element guide housing(s) is or are each arranged in a recess of the turbomachine blade or vane; in particular, each one is completely or entirely within the turbomachine blade or vane.

In one embodiment, exactly one individual tuning element is arranged in each of one or more cavities. The individual impact conditions can be tuned in each case in a targeted manner to specific frequencies and the turbomachine blade or vane can be correspondingly "de-tuned", as is explained in more detail in our WO 2012/095067 A1 named initially.

In one embodiment, the turbomachine blade or vane is a rotating blade or guide vane of a turbomachine, in particular a gas turbine, particularly an aircraft engine gas turbine, and/or a compressor stage or turbine stage of the gas turbine. One or more of the tuning element guide housings or recesses can be or will be arranged, in particular in each case, preferably completely, in a radial inner or radial outer shroud, in particular a root, or a body of the turbomachine blade or vane.

According to one aspect of the present invention, at least one cavity of at least one tuning element guide housing, in which at least one tuning element is taken up, is closed in a gas-tight manner; and in an enhancement, several, in particular all cavities of one or more tuning element guide housing(s) of the blade or vane arrangement for a turbomachine are closed in this way.

In one embodiment, advantageously, the tuning element(s) and its/their guide(s) can be protected thereby against an operating gas of the turbomachine, in particular an air flow of a compressor stage or an exhaust gas flow of a turbine stage, and thus their effects and/or service lives can be improved.

In one embodiment, a tuning element guide housing has two or more parts, in particular a base unit and a cover, which are or will be welded to one another and together define one or more of the cavities that are closed in a gas-tight manner, in particular all cavities of the tuning element guide housing that have been closed in a gas-tight manner. In one embodiment, a longer service life of the tuning element guide housing, in particular of the gas-tightness, can be achieved by a welding, in particular when compared with a soldering or bonding. In particular, in one embodiment, in order to improve the welding, one or more parts of the tuning element guide housing are made of Haynes 230, Hastelloy X, or the like.

In one embodiment, one or more of the tuning element guide housing(s) will be or are joined cohesively, in particular soldered, with the turbomachine blade or vane. This can be especially appropriate if a design service life of the tuning element guide housing is longer than a design service life of the turbomachine blade or vane. Since the cavities are already gas-tight, in particular due to welding of the multi-part tuning element guide housing, the tuning element guide housing in its turn may also not be or will not be (permanently) fastened, in particular by soldering, in a gas-tight manner in the recess of the turbomachine blade or vane, which can be of advantage, in particular, in the case of materials for turbomachine blades or vanes that are not weldable or are poorly weldable.

In one embodiment, one or more of the tuning element guide housing(s) is/are or will be fastened by means of a locking plate in the respective recess, in particular, in a form-fitting and/or friction-fitting manner. This can be particularly appropriate then when a design service life of the turbomachine blade or vane is longer than a design service life of the tuning element guide housing and this latter will thus be replaced one or more times. Correspondingly, in one embodiment, the tuning element guide housing(s) is/are or will be fastened to the respective recess inside the blade or vane, without a cohesive connection.

According to one aspect of the present invention, a tuning element guide housing is or will be fastened in a recess by means of a locking plate, by first introducing into the recess sequentially, or one after the other, the tuning element guide housing and subsequently or beforehand, the locking plate, through an introduction opening of the recess; and in an enhancement, subsequently joining together the tuning element guide housing and the locking plate in the recess, whereby the introduction opening, in particular its contour, is formed in such a way that it permits the sequential introduction of the tuning element guide housing and the locking plate, but prevents in form-fitting manner a withdrawal of the locking plate together with the tuning element guide housing that is particularly joined with it. In other words, in one embodiment, the tuning element guide housing and the locking plate are or will be joined together in the recess to form a structural unit, the outer dimension of which is larger than the introduction opening, so that the latter opening prevents in form-fitting manner a withdrawal of the structural unit and thus fastens tuning element guide housing and locking plate in the recess and fixes them with or without play of movement. Additionally or alternatively, the locking plate may also be or will be introduced into the recess after the tuning element guide housing and can be or will be fastened in the recess, in particular in a friction-fitting or form-fitting manner. Now if the introduction opening, in particular its contour, is formed in such a way that it permits such a sequential introduction of the tuning element guide housing and the locking plate, but prevents in form-fitting manner a withdrawal of the locking plate together or jointly with the tuning element guide housing, the locking plate fastened in the recess also advantageously prevents a withdrawal of the tuning element guide housing, even if the latter is not or will not be joined to the locking plate.

According to one aspect of the present invention, a tuning element guide housing is or will be fastened in a recess by means of a locking plate, by fastening the locking plate in the recess in a friction-fitting and/or form-fitting manner, in particular by means of one or more bent tab(s) of the locking plate, and locking plate and tuning element guide housing are or will be joined together in advance, at the same time, or subsequently. In other words, in one embodiment, on the one hand, the locking plate is or will be joined to the tuning element guide housing, and, on the other hand, is or will be fixed in the recess with or without play of movement.

In an enhancement, the locking plate is or will be secured against rotation in the recess, in particular by means of the bent tab(s). In one embodiment, the locking plate can be introduced into the recess in this way, in particular, together with the tuning element guide housing, or beforehand, by a rotational movement, and subsequently fastened in the recess and can be fixed there with or without play of movement. In an enhancement, the locking plate has a circular contour, at least in sections, for this purpose, in order to facilitate the rotational movement, particularly to guide it in form-fitting manner.

According to one aspect of the present invention, a locking plate is or will be joined to a tuning element guide housing in form-fitting manner, in particular by means of one or more bent tabs of the locking plate. Additionally, or alternatively, in one embodiment, the locking plate is or will be joined to the tuning element guide housing in a friction-fitting manner, in particular by means of one or more bent tabs of the locking plate.

According to one aspect of the present invention, a locking plate is or will be joined cohesively to a tuning element guide housing, in particular, soldered or welded. In particular, in order to remove the tuning element guide housing from the recess of the turbomachine blade or vane, in one embodiment, this cohesive connection can be separated, in particular, when locking plate and tuning element guide housing that are joined with one another cohesively to form a structural unit cannot be withdrawn together from an introduction opening of the recess. In a similar way, locking plate and tuning element guide housing joined to form a structural unit can also be removed from the recess as a structural unit, by loosening its fastening in the recess, for example, by bending back one or more bent tabs of the locking plate.

In one embodiment, the locking plate is or will be elastically deformed by the tuning element guide housing joined to it in the recess, and/or is or will be clamped in a friction-fitting manner against the recess. In an enhancement, two legs of a U-shaped locking plate are or will be elastically spread apart in the recess by the tuning element guide housing introduced in the space between its legs.

According to one aspect of the present invention, one or more tuning elements, particularly individually or by itself in each case, will be arranged in a cavity of a tuning element guide housing, the latter housing will be closed in a gas-tight manner, in particular by welding two or more parts of the tuning element guide housing, and the tuning element guide housing will be arranged, in particular subsequently, in a recess of the turbomachine blade or vane.

In an enhancement, the tuning element guide housing and a locking plate will be arranged, in particular beforehand, jointly, or subsequently, in the recess and fastened therein in a form-fitting or friction-fitting manner, particularly by bending one or more tabs of the locking plate. Additionally or alternatively, in one embodiment, the locking plate will be introduced through an introduction opening of the recess and fastened in the recess by joining with the tuning element guide housing, particularly in a friction-fitting or form-fitting manner or cohesively.

BRIEF DESCRIPTION OF THE DRAWING FIGURES

Additional advantageous enhancements of the present invention can be taken from the dependent claims and the following description of preferred embodiments. For this purpose and partially schematized:

FIG. 1A shows an introduction of a tuning element guide housing into a recess of a turbomachine blade or vane for a blade or vane arrangement for a turbomachine according to one embodiment of the present invention in a section;

FIG. 1B shows the tuning element guide housing introduced into the recess and fastened therein by means of a locking plate;

FIG. 2A shows a blade or vane arrangement for a turbomachine according to another embodiment of the present invention in a top view onto an introduction opening;

FIG. 2B shows a section along line B-B in FIG. 2A;

FIG. 3A shows a blade or vane arrangement for a turbomachine according to another embodiment of the present invention in a top view onto an introduction opening;

FIG. 3B shows a section along line B-B in FIG. 3A;

FIG. 4A shows a blade or vane arrangement for a turbomachine according to another embodiment of the present invention in a top view onto an introduction opening;

FIG. 4B shows a section along line B-B in FIG. 4A;

FIG. 5 shows a section through a blade or vane arrangement for a turbomachine according to another embodiment of the present invention;

DETAILED DESCRIPTION OF THE INVENTION

Figure 6A:
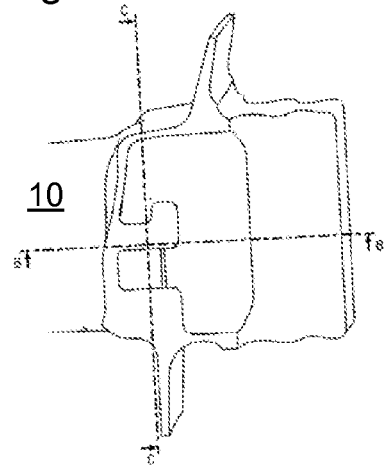
FIG. 6A shows a blade or vane arrangement for a turbomachine according to another embodiment of the present invention.
Figure 6C:
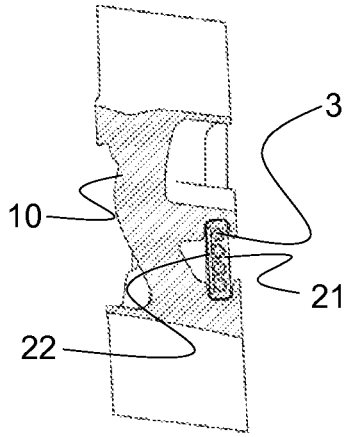
FIG. 6C shows a section along line C-C in FIG. 6A.
Figure 6B:
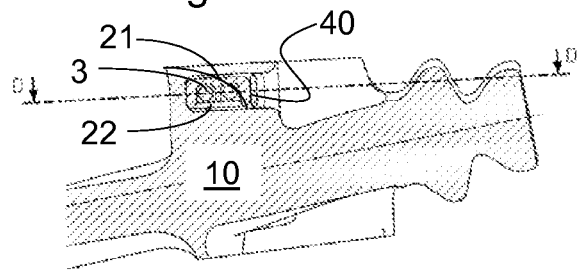
FIG. 6B shows a section along line B-B in FIG. 6A.

FIG. 1B shows in a section a part of a blade or vane arrangement for a turbomachine according to one embodiment of the present invention, with a turbomachine blade or vane 10 and a two-part tuning element guide housing, for example a tuner housing, 21, 22 having several cavities 11, in each of which an individual tuning element, for example a tuner, 3 is taken up, which is provided for impact contact with the tuning element guide housing.

The tuning element guide housing has a base unit 21 and a cover 22, which are welded to one another and together define the cavities that are closed in a gas-tight manner in this way.

The tuning element guide housing 21, 22 is or will be arranged completely in a recess 12 of the turbomachine blade or vane and fixed in form-fitting manner with play of movement therein by means of a locking plate 40. The recess 12 being defined by at least recess one wall.

For this purpose, as indicated in FIG. 1A, first, the tuning element guide housing 21, 22 will be introduced into the recess 12 through an introduction opening 13 of the recess. Subsequently, the locking plate 40 will be introduced through the introduction opening 13 and joined to the tuning element guide housing 21, 22 cohesively to form a structural unit by means of welding, as indicated in FIG. 1B by a weld.

The introduction opening 13 is designed in such a way, in particular dimensioned such that it permits the sequential introduction of the tuning element guide housing 21, 22 and the locking plate 40, but prevents in form-fitting manner a withdrawal of the locking plate together with the tuning element guide housing that is welded thereto, since the outer dimension of tuning element guide housing 21, 22 and locking plate 40 that are joined together to form a structural unit is greater than the introduction opening 13.

In order to remove the tuning element guide housing 21, 22 from the recess 12 of the turbomachine blade or vane 10, this weld can be separated.

FIG. 2A shows a blade or vane arrangement for a turbomachine according to another embodiment of the present invention in a top view onto an introduction opening 13; FIG. 2B shows a section along line B-B in FIG. 2A. Features corresponding to each other are identified by identical reference numbers, so that reference is made to the remaining description and only differences will be discussed in the following.

In the embodiment of FIG. 2, the tuning element guide housing 21, 22 and the locking plate 40 are or will be joined together in form-fitting manner to form a structural unit, by bending a tab 41 of the locking body 40 after the sequential introduction of locking plate 40 and subsequently tuning element guide housing 21, 22 through the introduction opening 13 into the recess 12. The introduction opening 13 has projections or stops 14 that fix the structural unit of tuning element guide housing 21, 22 and locking plate 40 joined to one another in form-fitting manner to form a structural unit, with play of movement in form-fitting manner in the recess 12.

In order to remove the tuning element guide housing 21, 22 from the recess 12 of the turbomachine blade or vane 10, the tab 41 can be bent back and then first the tuning element guide housing 21, 22 and subsequently the locking plate 40 can be removed from the recess 12.

In a way corresponding to FIG. 2A, FIG. 3A shows a blade or vane arrangement for a turbomachine according to another embodiment of the present invention in a top view onto an introduction opening 13; in a way corresponding to FIG. 2B, FIG. 3B shows a section along line B-B in FIG. 3A. Features corresponding to each other are again identified by identical reference numbers, so that reference is made to the remaining description and only differences will be discussed in the following.

In the embodiment of FIG. 3, tuning element guide housing 21, 22 and locking plate 40 can be or will be welded to each other beforehand. Additionally or alternatively, tuning element guide housing 21, 22 and locking plate 40 are or will be joined together in form-fitting manner by means of a bent tab 41 of the locking plate 40.

This structural unit of tuning element guide housing 21, 22 and locking plate 40 will be introduced via a rotational movement into the recess of the turbomachine blade or vane 10 until projections or stops 14 of the introduction opening limit this opening. Then another tab 42 of the locking plate 40 will be bent between the projections or stops 14, and in this way, the locking plate 40 or the structural unit made up of tuning element guide housing 21, 22 and locking plate 40 will be secured against rotation in form-fitting manner in the recess and thus fastened therein.

The structural unit made up of locking plate 40 and tuning element guide housing 21, 22 can be removed from the recess 12 by loosening its fastening in the recess 12 by means of bending back the tab 42 of the locking plate 40.

In a way corresponding to FIGS. 2A and 3A, FIG. 4A shows a blade or vane arrangement for a turbomachine according to another embodiment of the present invention in a top view onto an introduction opening 13; in a way corresponding to FIGS. 2B and 3B, FIG. 4B shows a section along line B-B in FIG. 4A. Features corresponding to each other are again identified by identical reference numbers, so that reference is made to the remaining description and only differences will be discussed in the following.

In the embodiment of FIG. 4, two legs 43, 44 of the U-shaped locking plate 40 are or will be elastically spread apart in the recess 12 by the tuning element guide housing 21, 22 which is advantageously designed in wedge shape for this purpose and introduced into the groove defined by the legs 43, 44. On the one hand, they will be clamped against the recess in a friction-fitting manner in this way. On the other hand, they thus engage behind the introduction opening 13, so that the locking plate 40, which is spread apart by the tuning element guide housing 21, 22 joined to it, is also fixed in form-fitting manner in the recess 12, since its introduction opening prevents a withdrawal of the locking plate 40 together with the tuning element guide housing 21, 22 joined to the locking plate in form-fitting manner. In addition to the friction fit by means of the bent tab 41 of the locking plate 40, the tuning element guide housing 21, 22 is joined to the locking plate in form-fitting manner.

FIG. 5 shows a section through a blade or vane arrangement for a turbomachine according to another embodiment of the present invention. Features corresponding to each other are again identified by identical reference numbers, so that reference is made to the remaining description and only differences will be discussed in the following.

In the embodiment of FIG. 5, first, the tuning element guide housing 21, 22 will be introduced into the recess 12 through the introduction opening 13 and lowered into this recess. Subsequently, the locking plate 40 will be introduced into the recess 12 through the introduction opening 13 and fastened therein in a friction-fitting or form-fitting manner, e.g., by one or more bent tabs (not shown). The introduction opening 13 is designed in such a way that tuning element guide housing 21, 22 and locking plate 40 cannot be withdrawn together. Since the locking plate 40 is fastened in the recess 12, it also prevents a withdrawal of the tuning element guide housing 21, 22 through the introduction opening 13.

FIGS. 6A-6F show sections through a blade or vane arrangement for a turbomachine according to another embodiment of the present invention. Features corresponding to each other are again identified by identical reference numbers, so that reference is made to the remaining description and only differences will be discussed in the following.

In the embodiment of FIG. 6, the two-part tuning element guide housing with the base unit 21 and the cover 22 welded thereto has eight cavities 11, which are closed in a gas-tight manner, in each of which an individual tuning element 3 is taken up, which is provided for impact contact with the tuning element guide housing.

Figure 6D:
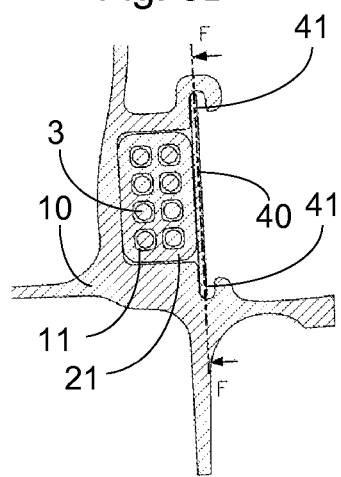
FIG. 6D shows a section along line D-D in FIG. 6B.
Figure 6E:
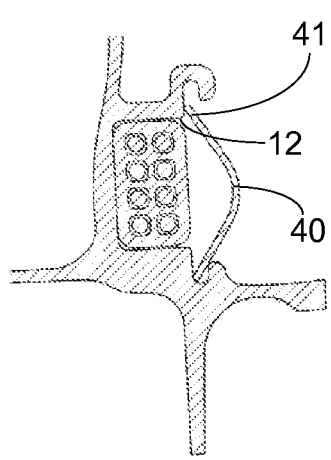
FIG. 6E shows the section of FIG. 6D during an arranging of a locking plate.
Figure 6F:
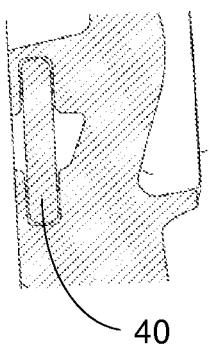
FIG. 6F shows a section along line F-F in FIG. 6D.

The tuning element guide housing 21, 22 is taken up in a recess 12 in an inner shroud of the turbomachine blade or vane 10 and is fastened by means of a locking plate 40 in form-fitting manner, For this purpose, opposite-lying tabs 41 of the locking plate 40 are or will be introduced by bending into undercuts in the recess 12 and fastened therein in form-fitting manner, as can be recognized, in particular, from the sequence of figures: FIG. 6E→FIG. 6D and the sections: FIG. 6D, FIG. 6F.

Although exemplary embodiments were explained in the preceding description, it shall be noted that a plurality of modifications is possible. In addition, it shall be noted that the exemplary embodiments only involve examples that in no way shall limit the scope of protection, the applications, and the construction. Rather, a guideline is given to the person skilled in the art by the preceding description for implementing at least one exemplary embodiment, whereby diverse changes, particularly with respect to the function and arrangement of the described components, can be carried out without departing from the scope of protection, as it results from the claims and combinations of features equivalent to these.

What is claimed is:

1. A blade or vane arrangement for a turbomachine, comprising:
   a turbomachine blade or vane including a recess defined by at least one recess wall; and
   at least one tuner guide housing with at least one cavity, in which at least one tuner that is provided for impact contact with the tuner guide housing is taken up, and a locking plate joined to the tuner guide housing,
   wherein the tuner guide housing is fastened in the recess of the turbomachine blade or vane by the locking plate in a form-fitting or friction-fitting manner,
   wherein the cavity of the tuner guide housing in which the tuner is taken up, is closed in a gas-tight manner, and
   wherein the locking plate is in direct contact with the tuner guide housing and the at least one recess wall.

2. The blade or vane arrangement for a turbomachine according to the claim 1, wherein the tuner guide housing has at least two parts that are welded together and define the cavity, which is closed in a gas-tight manner.

3. The blade or vane arrangement for a turbomachine according to claim 1, wherein the locking plate is joined cohesively to the tuner guide housing.

4. The blade or vane arrangement for a turbomachine according to claim 1, wherein the recess has an introduction opening, which permits a sequential introduction of the tuner guide housing and the locking plate and prevents a withdrawal of the locking plate together with the tuner guide housing that is joined to it in form-fitting manner.

5. The blade or vane arrangement for a turbomachine according to claim 1, wherein the locking plate is fastened in the recess in a friction-fitting or form-fitting manner by at least one bent tab.

6. The blade or vane arrangement for a turbomachine according to claim 1, wherein the locking plate is elastically deformed by the tuner guide housing that is joined thereto, and/or is clamped against the recess in a friction-fitting manner.

7. The blade or vane arrangement for a turbomachine according to claim 1, wherein the tuner guide housing is joined cohesively to the turbomachine blade or vane.

8. The blade or vane arrangement for a turbomachine according to claim 1, wherein at least one blade or vane arrangement is configured and arranged in a turbomachine.

9. The blade or vane arrangement for a turbomachine according to claim 1, wherein the at least one tuner is arranged in the cavity of the at least one tuner guide housing, the housing being closed in a gas-tight manner by welding of at least two parts of the tuner guide housing, and the tuner guide housing is arranged in the recess of the turbomachine blade or vane.

10. The blade or vane arrangement for a turbomachine according to claim 9, wherein a locking plate is arranged in the recess and is fastened in the recess in a form-fitting or friction-fitting manner by bending a tab.

11. The blade or vane arrangement for a turbomachine according to claim 9, wherein a locking plate is introduced through an introduction opening of the recess and is fastened in the recess by joining to the tuner guide housing in a friction-fitting or form-fitting manner, or cohesively.

* * * * *